(12) United States Patent
Russell

(10) Patent No.: US 6,325,367 B1
(45) Date of Patent: Dec. 4, 2001

(54) SAFETY BACK STOP

(75) Inventor: Robert L. Russell, Frankfort, IL (US)

(73) Assignee: Power Brake Dies, Inc., South Holland, IL (US)

(*) Notice: Subject to any disclaimer, the term of this patent is extended or adjusted under 35 U.S.C. 154(b) by 0 days.

(21) Appl. No.: 09/428,429

(22) Filed: Oct. 27, 1999

(51) Int. Cl.[7] .............................. B23Q 3/00; B21D 11/22
(52) U.S. Cl. ................ 269/317; 29/281.1; 29/281.5; 29/283.5; 29/243.5; 33/613; 72/461
(58) Field of Search ......................... 33/533, 832, 833, 33/534, 613, 623, 626, 628, 630, 638, 642, 644, 645, 549, 568, 569, 573; 269/303, 304, 305, 306, 315, 317; 29/281.1, 281.5, 283.5, 243.5; 248/610, 613; 72/461

(56) References Cited

U.S. PATENT DOCUMENTS

| | | | |
|---|---|---|---|
| 16,631 | * | 2/1857 | Went ................................ 59/2 |
| 221,745 | * | 11/1879 | Seery .............................. 59/35.1 |
| 958,641 | * | 5/1910 | Heeren .......................... 29/896.41 |
| 2,189,086 | * | 2/1940 | Seagren .......................... 269/317 |
| 2,340,805 | * | 1/1944 | Garbergding ................... 269/317 |
| 2,439,424 | * | 4/1948 | Goodloe et al. ................. 140/71 C |
| 2,685,827 | * | 8/1954 | Mason ............................. 493/464 |
| 2,769,493 | * | 11/1956 | Karsoe ............................ 269/317 |
| 3,262,695 | * | 7/1966 | Fowler ............................ 269/317 |
| 3,923,413 | * | 12/1975 | Giles ............................... 408/72 R |
| 3,931,671 | * | 1/1976 | Dittmann ......................... 72/461 |
| 3,949,587 | * | 4/1976 | Simmons, Sr. ................... 72/461 |
| 3,971,408 | * | 7/1976 | Simmons .......................... 137/888 |
| 3,986,379 | * | 10/1976 | Mansell ............................ 72/57 |
| 4,106,147 | * | 8/1978 | Furuto ............................. 470/153 |
| 4,583,391 | * | 4/1986 | Stafford ........................... 72/461 |
| 4,641,821 | * | 2/1987 | Jaworski .......................... 269/234 |
| 5,603,236 | * | 2/1997 | Hongo ............................. 72/319 |
| 5,657,656 | * | 8/1997 | Evans et al. ..................... 72/14.8 |
| 5,661,994 | * | 9/1997 | Sundquist ........................ 72/389.6 |

FOREIGN PATENT DOCUMENTS 4060-91335 * 4/1994 (JP) ................................ 72/461

OTHER PUBLICATIONS

The Cincinnati Shoper Co. Cata;og B–12, Dec. 28, 1959, pp. 30–31.*

* cited by examiner

Primary Examiner—Diego Gutierrez
Assistant Examiner—Maria Fernandez
(74) Attorney, Agent, or Firm—McCaleb, Lucas & Brugman

(57) ABSTRACT

A novel back stop gauge for determining accurate and safe positioning of work piece material in a machine tool, such as a press brake, wherein a linear stop has an axially stiff, but transversely flexible coil spring intermediate end portions, one end portion being engaged by work piece material and the opposite end portion being anchored to a cooperating support. Misplacement of work material either over or beneath the stop, while normally destructive of the work piece upon closure of the press brake, does not result in damage to the machine tool or the press because of the flexible nature of the back stop, which permits movement of the stop out of the path of the machine tool.

4 Claims, 4 Drawing Sheets

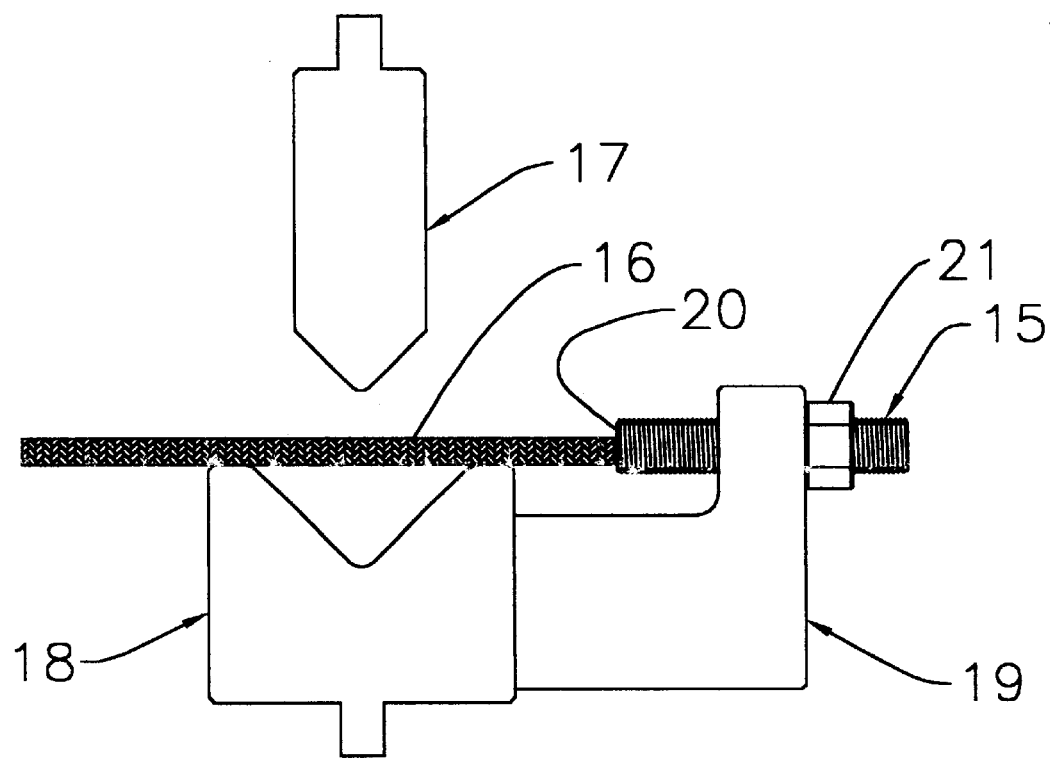
PRIOR ART  FIG.1
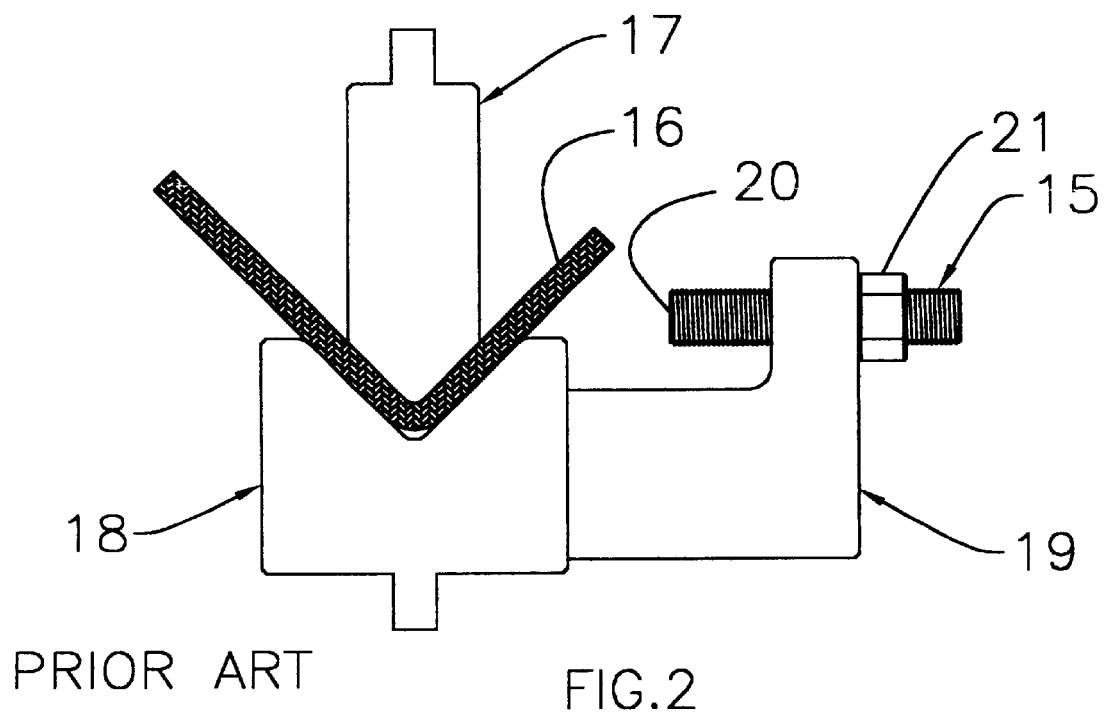
PRIOR ART  FIG.2

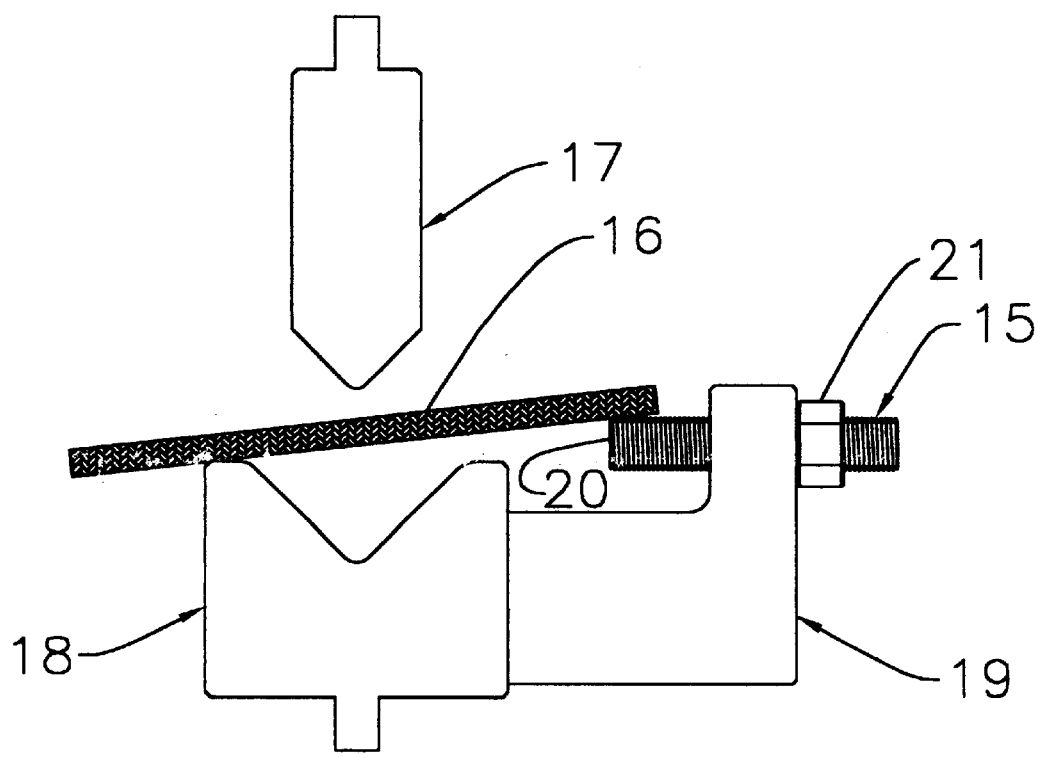
PRIOR ART  FIG.3
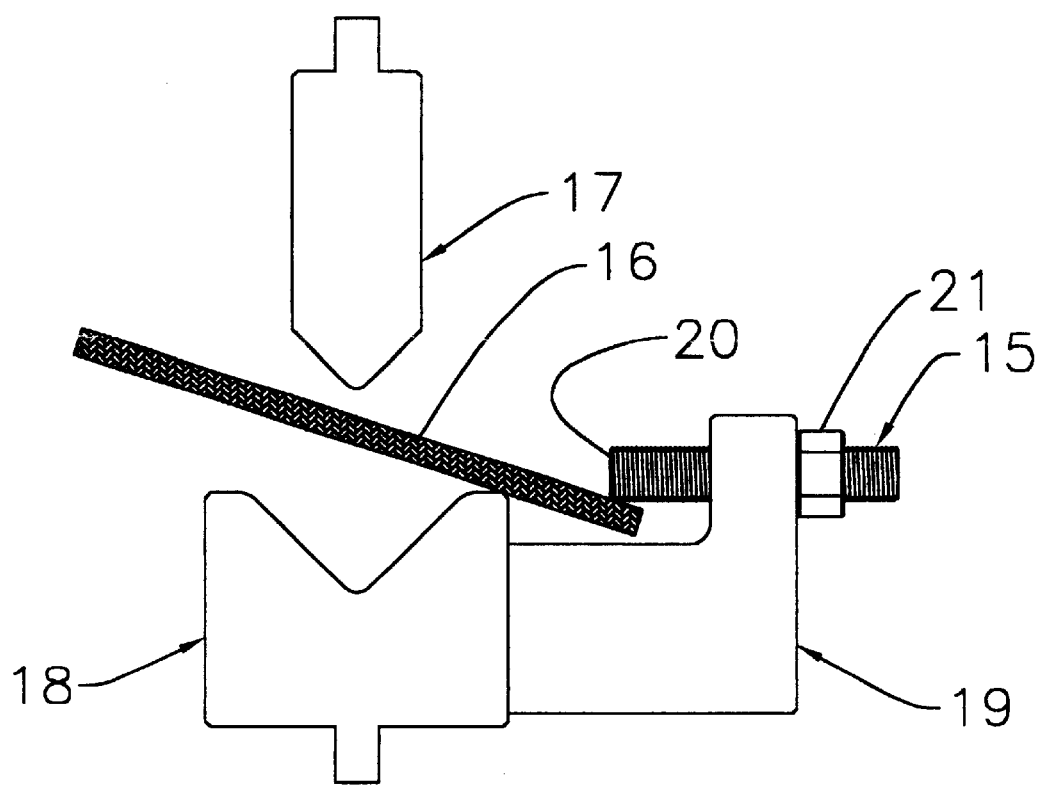
PRIOR ART  FIG.4

SAFETY BACK STOP

This invention relates to a novel gauge system for insuring an accurate, safe and effective precise location of work material, include sheet metal or plate, in a machine tool, such as a press brake.

BACKGROUND OF THE INVENTION

It is currently common practice to use rigid screw type back stops in machine tools, dies, jigs and fixtures for the purpose of providing repeatable, accurate positioning of work pieces in a press while allowing stop adjustment to insure accurate positioning of the work pieces in the tool or fixture. In some instances, however, the required stop gauge position in the particular tool is such as to produce interference with mating parts of the machine tool during normal operation. In such cases the machine tool is usually modified to provide clearance for the stop gauge. In some cases there may be multiple locations of the stop gauge in order to accommodate different parts to be made or formed in the same machine tool. To that end multiple clearance slots may be required in the machine tool. This procedure is not only expensive, but materially reduces tool life. Such slots even can be dangerous if during the set up of the machine tool great care is not taken by the set up person to insure proper alignment of the stop gauges and mating tool clearance slots. If misalignment does take place in a press set up, for instance, more than likely there will be considerable damage to the accompanying tooling and possibly to the press, to say nothing of possible danger to the press operator or set up person.

There are many instances where even if there is not interference between the stop gauges and the production tooling, there is still the opportunity for operator error, particularly in piece work situations. For example, the operator may inadvertently place the work piece on top of or underneath the stop gauge. In that event, serious damage to the conventional rigid stop gauge and work piece is inevitable once the press or machine is actuated. Furthermore, risk of injury to the operator or damage to the machine tool is present. Accidents of the type briefly described above are costly, not only in down time and repairs, but in the risk of human lives and limbs.

It is a primary object of this invention to provide a simple, inexpensive, but highly effective stop gauge for machine tools that eliminates much of the cost and dangers associated with the commonly used standard screw type gauge system.

It is a further object of this invention to provide a stop gauge as set out in the immediate preceding object which embodies a basic concept readily useful in precision automated gauging systems with no loss of accuracy.

It is another important object of this invention to provide an improved back stop for machine tools which prevents extensive damage to an associated machine tool.

BRIEF SUMMARY OF THE INVENTION

This invention is embodied in a back stop gauge, particularly useful with press brakes and similar machine tools for forming, shaping and operating on sheet material or metal plate, for instance, wherein precise location of the work pieces is requisite to uniform product; the stop gauge hereof comprising a simple linear assembly of a work piece engagable cap member and a mounting stem at opposite ends of a resilient member, such as a flexible spring having a normal linear axial configuration, but capable of linear deflection under linear load; the stop gauge being axially rigid and incompressible under axial load.

Having described this invention the above and other objects, features and advantages there will be recognized by those skilled in the art from the following description of a preferred embodiment thereof illustrated in the accompanying drawings.

IN THE DRAWINGS

FIG. 1 is an end elevation of standard press brake tooling with a typical standard screw type stop gauge showing a typical work piece in place abutting the stop gauge prior to bending operation of the press;

FIG. 2 is an end elevation of the tooling shown in FIG. 1 with the tools shown closed and the work piece properly formed;

FIG. 3 is an end elevation similar to FIG. 1 but showing the work piece improperly placed on top of the stop gauge prior to press operation;

FIG. 4 is still another end elevation of the press brake tooling seen in FIGS. 1–3 showing the work piece erroneously placed under the stop gauge prior to press operation;

DESCRIPTION OF THE PREFERRED EMBODIMENT

Figure 5:
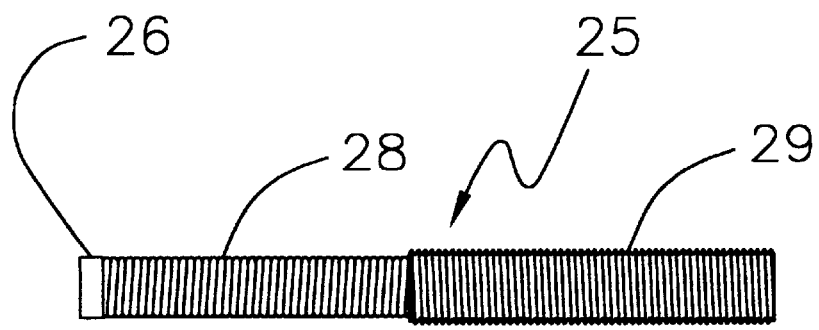
FIG. 5 is a side elevation of a stop gauge according to this invention.

Turning now to the embodiment of this invention set forth in the drawings, particular attention is initially directed to FIGS. 1–4, as illustrative of the difficulties and problems encountered in the prior art.

In FIG. 1 a typical screw-type adjustable back stop gauge 15 is shown as it is normally mounted in a press brake forming application. As illustrated, material 16 to be formed is precisely located by abutting the screw back-stop gauge 15 associated with forming tools mounted in the press brake. In this instance, the forming tools comprise a forming punch 17 and a forming die 18 located on opposite sides of the work piece material 16. These tools are secured and aligned in the press by means of standard press holders and clamps (not illustrated) which assures consistent alignment of the tools during each press operation.

The standard screw gauge 15 is positioned by means of mating threads in a gauge holder 19 associated with the forming die 18. Gauge 15 is threadingly advanced and retracted by threaded movement within a threaded opening in holder 19 until the desired position of its outer end 20 is achieved; the gauge 15 thereupon locked in placed by means of a locking nut 21 according to known practice.

As seen in FIG. 2 of the drawings the forming punch 17 and the forming die 18 are shown in a closed position with the work material 16 therebetween after a bending closure of the press tools is complete. During the bending operation the material 16 forms freely and moves away from the screw back stop gauge 15 without any particular interfering incident under normal operating conditions.

It will be recognized that when properly used as shown in FIGS. 1 and 2, the screw type adjustable back stop system for locating work material in a forming tool is generally safe, dependable and operationally accurate. However, in the world of high production and repetitive piece work, operational mistakes frequently happen which can be and often are hazardous to the machine operator, the tooling and the machine itself.

With reference now to FIG. 3 it will be recognized that the same tools illustrated in FIGS. 1 and 2 are shown with the material or work piece 16 to be formed accidentally positioned or placed over the top of the locating back-stop gauge 15. If the press brake is cycled while material 16 is in this position, serious and usually costly damage will result to the screw gauge 15 per se, the holder 19 and the work material 16 with possible damage to the forming tools 17 and 18, as well as the press and operator.

In FIG. 4 the same tools of FIGS. 1–3 are shown again and this time the material 16 is placed accidentally beneath or under the locating screw 15. If the press brake is cycled while the work piece 16 is in this position, serious and very costly damage will follow to the back stop gauge 15, the gauge holder 19 and the work material 16, including likely damage to the forming tools, the press and possible injury to the operator.

From the foregoing situation, illustrated in FIGS. 1–4 of the drawings, it will be readily understood that misplacing the work material against the back stop gauge, particularly when a rigid screw type of stop gauge is utilized, is not only a costly mistake, but can be seriously dangerous and damaging to equipment and personnel.

In FIGS. 5–8 of the drawings, the features of a stop gauge in accordance with the present invention are set forth; the illustrated embodiment presently being the best mode presently contemplated for practicing this invention. specifically, the stop gauge 25 shown in FIGS. 5–8, is a three piece construction including a cylindrical end cap 26, a resilient mid section 28 and body portion 29. The three elemental portions of gauge 25 are coaxially aligned and interfitted, as will appear presently, to present a axially rigid structure capable of transverse flexing. It is to be noted that body portion 29 is provided with a standard wrench receptive socket 30 at its outer end (see FIG. 6) whereby its externally threaded body may be adjustably advanced and retracted with respect to the internally threaded gauge holder 19 or other equivalent gauge holding structure.

Figure 6:
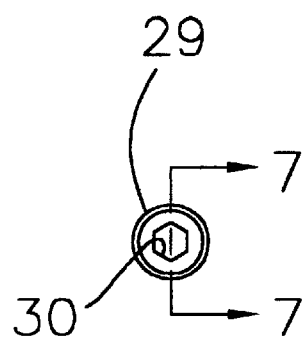
FIG. 6 is a right hand end elevation of the stop gauge shown in FIG. 5.
Figure 7:
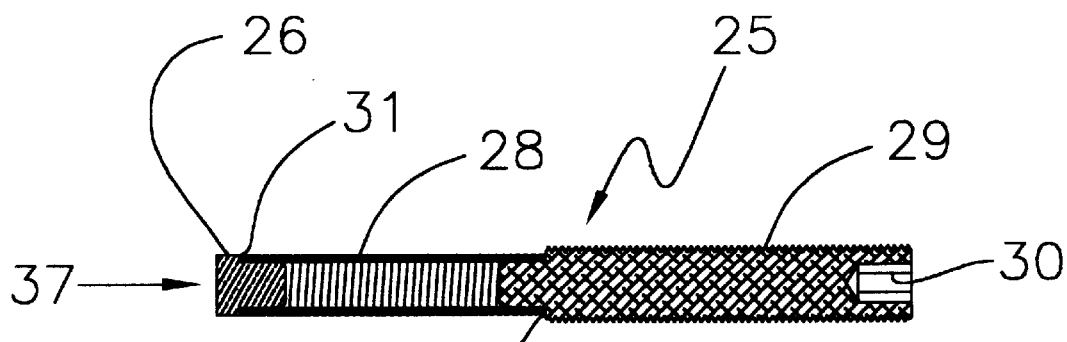
FIG. 7 is a full cross sectional view of the stop gauge shown in FIG. 5, taken substantially along vantage line 7—7 of FIG. 6, and looking in the direction of the arrows.

FIG. 7 is a full cross sectional view of the assembled gauge 25, taken substantially along vantage line 7—7 of FIG. 6 and from which view the manner of assembling the three parts or portions of the gauge is clearly apparent. It is to be regarded, in particular, that cap 26 and one end of the threaded body member 29 are each suitably shouldered as at 31 and 32, respectively, to form opposing cylindrical portions 33 and 34 (see FIG. 8) of reduced diameter having external threads 35 and 36, respectively, whereby cap 26 and the threaded body portion 29 are able to closely mate with the inside bore and pitch of the coils in spring 28. The size of the threaded ends 33 and 34 and the threads 35 and 36 thereon, respectively, are such as to provide a threaded resistance fit with the spring member 28.

The midsection 28 is a heavy expansion type coil spring with a selected number of coils wound in such a manner as to insure that there is little or no axial space between adjacent coils. This tight wrapping of the spring insures that the dimensions from the outer end of cap 26 to the adjustably positioned threaded body portion 29 is held at a constant fixed dimension even when the spring is subjected to an axial compression forces (indicated by arrow 37 in FIG. 7) as would be exerted on cap 26 by material 16 positioned against the back stop gauge of this invention.

Figure 8:
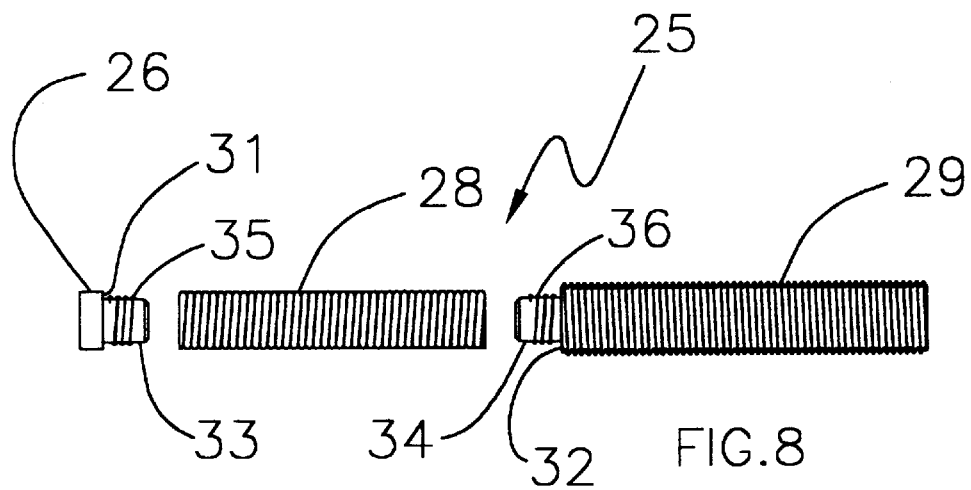
FIG. 8 is a side elevation of the individual parts of the gauge shown in FIG. 5 with such parts axially separated.

FIG. 8 shows the individual portions or pieces of the gauge 25 prior to assembly. As there indicated, cap 26 and the threaded body portion 29 are coaxially arranged with the intervening spring 28 in assembly. It further is to be recognized that while a coil spring 28 is herein illustrated, other forms of flexible connective devices between the cap and body portion 29 are available so long as they provide a rigid, substantially non-compressible axial formation capable of transverse flexing under laterally imposed loads, as shown in FIGS. 3 and 4, for instance.

Figure 9:
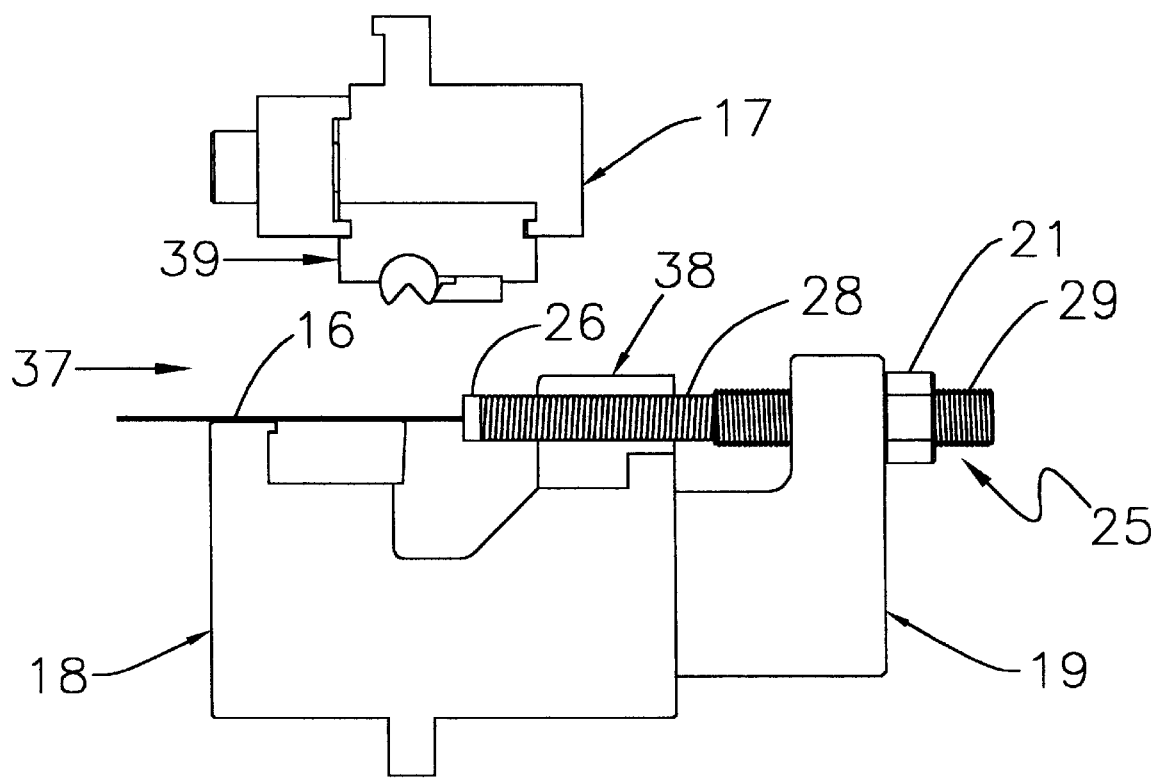
FIG. 9 is a end elevation of press brake punch and die tooling in an open position with a work piece abutted against one end of a back stop gauge according to this invention.
Figure 10:
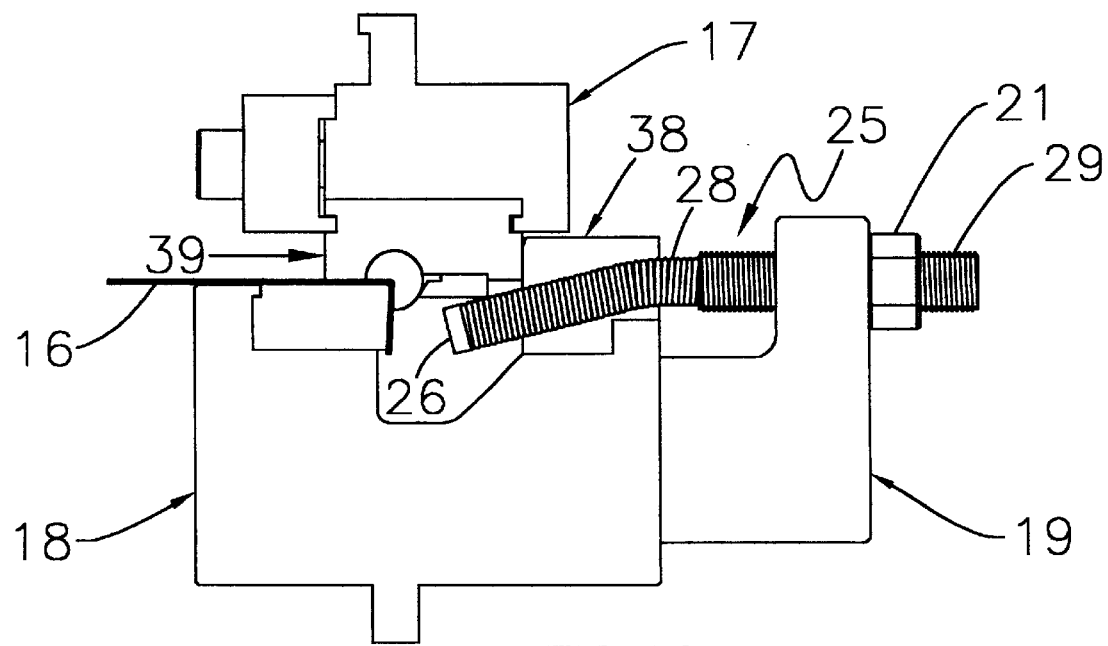
FIG. 10 is another end elevation similar to FIG. 9, showing the punch and die tooling in a closed position and the work piece formed after press operation.

As shown in FIG. 9, a typical use for the new back-stop gauge of this invention is illustrated. The threaded portion 29 of the gauge is located in holder 19 and threadingly adjusted to precisely position the end cap 26, so that material 16 to be formed is located at exactly the correct dimension or position to provide the desired product part. The material to be formed is held in position by applying force to the back gauge in the direction of the arrow 37. In certain instances the cap 26 can be magnetized to hold the material to be formed in place during the folding or bending operation provided, of course, that the work material is magnetic. There also can be any number of gauges used at one time determined by the number of parts or bends being made at any one time and the available space in the tooling. In the tools, as shown in FIGS. 9 and 10, the die section 18 can be of any length, while the heel pieces 38 are made in shorter sections and mounted to the die section 18 in a manner to provide spaces between adjacent heel sections, receptive of the midsection spring 28 of the back stop gauge assembly 25. In this manner the various stop gauges can be mounted without interfering with the die section.

In the illustrated example, the upper forming tool 39 is the same overall length of the holder section 17. With the particular illustrated tool design shown, interference with the back stop gauge 25 is unavoidable, as indicated in FIG. 10. At present, if confronted with a situation such as that illustrated in FIGS. 9 and 10, the only known way to solve the problem of interference with the back gauge or gauges is to machine clearance pockets in the upper forming tool 39. These pockets materially shorten the life and performance of the tool in a very negative way. In this situation utilizing the improved back stop gauge 25 as shown in FIG. 10 and placing a work piece or material to be formed accidentally over the top of a solid back stop gauge as in FIG. 3 above would usually result in damage to the tooling of FIGS. 9 and 10. However, as shown, by using the back stop gauge 25 hereof, its capability to transversely flex and deform, provided by the central spring 28, avoids the tool damage as would normally occur with a solid fixed back stop gauge 15 (FIGS. 1–4).

The advantages of the herein disclosed flexible safety back stop gauge 25 are readily apparent from FIG. 10. Rather than cutting many expensive clearance safety pockets in the upper tooling 39, for example, the upper tooling is kept as is and when the flexible back stop gauge hereof is hit by the upper forming tool 39 at the bottom of each press stroke, no damage occurs to either the gauge or the forming tool, because of the flexible movement of the gauge spring 28. The flexible spring of the gauge combination will withstand thousands of hits without any damage or sacrifice to accuracy. Even if the material to be formed is placed over the top of the flexible back stop gauge 15 there will be no permanent damage to the tools, the gauges, the press or the operator.

It is further to be noted that although the example of the back stop gauge 25, above described, is shown with threaded stem portion 29 as the most common standard mounting form, it is not the only possible form or manner of mounting the stop gauge. In a similar vein cap 26 which can be made with many shapes or forms may be used in conjunction with expensive automated back gauging systems or other devices, which may or may not require the use of a threaded stem portion 29.

From the foregoing it is believed that those skilled in the art will readily recognize and appreciate the advanced novelty of the current invention and will readily understand that while the same has herein been described in conjunction with a preferred embodiment thereof illustrated in the accompanying drawings, the same nevertheless may be subject to change, modification or substitution of equivalents without departing from the spirit and scope of the invention which is intended to be unlimited by the foregoing except as may appear in the following appended claims.

The embodiments of the invention in which an exclusive property or privilege is claimed are defined as follows:

1. In a forming machine having a work zone receptive of workpiece material and a back stop gauge for accurately positioning said work piece material in said work zone an improved back stop gauge comprising;
    a rigid linear mounting portion adapted to be adjustably connected at one end to a stationary support;
    an end cap engaging work piece material to be formed in said work zone; and
    linear spring means, that is substantially non-deformable under compressive loads applied along its linear axis, but is laterally deformable under loads applied transversely of said axis, coaxially interjoining said mounting portion and said end cap.

2. The combination of claim 1, wherein said linear spring means is an axially rigid, multiple coil spring in which adjacent coils are in close engaging contact with one another.

3. The combination of claim 2, wherein said mounting portion and said end cap each have an externally threaded cylindrical portion at one end, whereby said mounting portion is threadingly engaged with interior coils at one end of said spring means and said end cap is likewise engaged with the opposite end of said spring means.

4. The combination of claim 1, wherein said end cap, linear spring means and said mounting portion have interfitting portions and are joined end to end to form a unitary linear stop; whereby said end cap is positionable at precise locations relative to said working zone.

* * * * *

UNITED STATES PATENT AND TRADEMARK OFFICE
CERTIFICATE OF CORRECTION

PATENT NO. : 6,325,367 B1
DATED : December 4, 2001
INVENTOR(S) : Robert L. Russell It is certified that error appears in the above-identified patent and that said Letters Patent is hereby corrected as shown below:

Column 5, line 26 through Column 6, line 1,
"In a forming machine having a work zone receptive of workpiece material and a back stop gauge for accurately positioning said work piece material in said work zone" should be -- For use in accurately positioning work piece material in the work zone of a forming machine, --

Column 6,
Line 4, "connected at one end" should be -- connectable --
Line 5, "cap engaging work piece" should be -- cap for engaging --
Line 6, "said" should be -- the --
Line 8, "compressive" should be deleted
Line 10, -- for -- should be inserted between "axis," and "coaxially"
Line 14, "engaging" should be deleted
Line 18, "at one end," should be deleted
Line 23, "linear" should be -- said --
Line 24, "and are" should be deleted
Line 25, -- said mounting portion being adjustably connected to said support -- should be inserted between "stop;" and "whereby"
Line 25, -- selectively -- should be inserted between "is" and "positionable"
Line 26, "relative to" should be -- in --
Line 26, "working" should be -- work --.

Signed and Sealed this

Twenty-fourth Day of September, 2002

Attest:

Attesting Officer

JAMES E. ROGAN
Director of the United States Patent and Trademark Office